United States Patent
Choi et al.

(10) Patent No.: US 11,149,215 B2
(45) Date of Patent: Oct. 19, 2021

(54) SUPERCRITICAL WATER PROCESS TO PRODUCE BOTTOM FREE HYDROCARBONS

(71) Applicant: Saudi Arabian Oil Company, Dhahran (SA)

(72) Inventors: Ki-Hyouk Choi, Dhahran (SA); Bader Alotaibi, Dhahran (SA); Mohammad Garhoush, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/025,307

(22) Filed: Sep. 18, 2020

(65) Prior Publication Data

US 2021/0002565 A1    Jan. 7, 2021

Related U.S. Application Data

(62) Division of application No. 16/442,189, filed on Jun. 14, 2019, now Pat. No. 10,920,158.

(51) Int. Cl.
*C10G 61/02* (2006.01)
*B01J 3/00* (2006.01)

(52) U.S. Cl.
CPC .............. *C10G 61/02* (2013.01); *B01J 3/008* (2013.01); *C10G 2300/1044* (2013.01); *C10G 2300/805* (2013.01)

(58) Field of Classification Search
CPC ............................................ B01J 2219/00006
See application file for complete search history.

(56) References Cited

U.S. PATENT DOCUMENTS

| | | | |
|---|---|---|---|
| 2,294,699 A | 9/1942 | Stefen | |
| 3,148,136 A | 9/1964 | Woodle | |
| 3,367,862 A | 2/1968 | Mason et al. | |
| 4,341,619 A | 7/1982 | Poska | |
| 4,487,686 A | 12/1984 | Gomi et al. | |
| 4,792,389 A | 12/1988 | Frohn et al. | |
| 7,947,165 B2 | 5/2011 | Berkowitz et al. | |
| 9,675,956 B2 | 6/2017 | Greene | |
| 9,926,497 B2 | 3/2018 | Choi et al. | |
| 2007/0056881 A1 | 3/2007 | Berkowitz et al. | |
| 2008/0099374 A1* | 5/2008 | He | B01J 3/008 208/177 |
| 2008/0099378 A1 | 5/2008 | He et al. | |
| 2009/0166262 A1 | 7/2009 | He | |
| 2016/0145499 A1* | 5/2016 | Choi | B01J 20/28045 585/650 |
| 2016/0312129 A1* | 10/2016 | Choi | B01J 3/008 |
| 2018/0010057 A1 | 1/2018 | Coppola | |
| 2018/0258353 A1 | 9/2018 | Choi et al. | |

FOREIGN PATENT DOCUMENTS

| | | |
|---|---|---|
| CA | 2774062 A1 | 4/2011 |
| EP | 1505141 A2 | 2/2005 |
| WO | 2011048642 A1 | 4/2011 |

OTHER PUBLICATIONS

International Search Report and Written Opinion of the International Searching Authority, dated Aug. 26, 2020, for PCT Application No. US2020037647, 16 pages.

* cited by examiner

*Primary Examiner* — Randy Boyer
(74) *Attorney, Agent, or Firm* — Bracewell LLP; Constance Gall Rhebergen

(57) ABSTRACT

A process to produce a light hydrocarbon fraction from a heavy residue feed, the process comprising the steps of operating the first supercritical reactor such that the heavy residue feed and the supercritical water stream undergo conversion reactions to produce a reactor effluent, introducing the reactor effluent to a top inlet in a top portion of a second supercritical reactor, introducing a supercritical water stream to a bottom inlet in a bottom portion of the second supercritical reactor, operating the second supercritical reactor such that the bottom of the barrel fraction is configured to settle in the bottom portion of the second supercritical reactor, withdrawing an upgraded product stream from a top outlet in the top portion of the second supercritical reactor, and withdrawing a heavy product stream from a bottom outlet in the bottom portion of the second supercritical reactor.

10 Claims, 2 Drawing Sheets

SUPERCRITICAL WATER PROCESS TO PRODUCE BOTTOM FREE HYDROCARBONS

CROSS-REFERENCE TO RELATED APPLICATIONS

This application is a divisional application of and claims priority from U.S. Non-Provisional patent application Ser. No. 16/442,189 filed on Jun. 14, 2019, now U.S. Pat. No. 10,920,158. For purposes of United States patent practice, this application incorporates the contents of the Non-Provisional Application by reference in its entirety.

TECHNICAL FIELD

Disclosed are methods for upgrading petroleum. Specifically, disclosed are methods and systems for upgrading petroleum to produce a bottom-free hydrocarbon stream.

BACKGROUND

One of the biggest challenges of refining crude oil is the heaviest fraction, also known as the "bottom of the barrel." Upgrading the bottom of the barrel to produce valuable fuel and chemicals is difficult due to its composition and boiling point. The bottom of the barrel, which often is equivalent to the vacuum residue fraction, has a boiling point of greater than 1050 deg F. (565 deg C.). The bottom of the barrel can include concentrated amounts of asphaltenes, metallic compounds, such as nickel and vanadium, sulfur, nitrogen, and oxygen. These compounds can be present in greater concentrations than in other fractions of the crude oil.

Refining these compounds is difficult for several reasons. Processing fractions with high concentrations of asphaltenes can result in the precipitation of those fractions to form coke or sludge. High concentrations of heteroatoms, particularly metallic compounds can cause sever and rapid deactivation of catalysts. Finally, the greater molecular weights and complicated molecular structures of the compounds found in the bottom of the barrel can hinder access to catalyst, due to steric hindrance, limiting conversion of those compounds. As a result, the bottom of the barrel fraction is the least utilized and lowest valued fraction of crude oil.

One process to treat the bottom of the barrel fraction is hydroprocessing. Hydroprocessing converts heavy compounds to light hydrocarbons in the presence of a catalyst and external supply of hydrogen. Hydroprocessing requires access to large amounts of hydrogen. Additionally, because of the concentrated amount of inhibitors, such as asphaltene, converting the bottom of the barrel fraction requires hydrogen pressures greater than 100 bar and often closer to 150 bar and temperatures greater than 400 deg C. Compressing hydrogen to these conditions requires significant amounts of energy and the materials of construction must be special alloys to maintain mechanical integrity under such a high hydrogen partial pressure environment. Even under optimal conditions, hydroprocessing units tend to be limited to about 60 percent by weight (wt %) conversion of bottom of barrel fraction to lighter hydrocarbons.

Another process used to treat the bottom of the barrel fraction is thermal cracking, where the major reaction is the breaking of carbon-carbon bonds. In thermal cracking operations, such as a coking process, lighter hydrocarbons can be produced from the bottom of the barrel fraction, but an amount of the carbon in the fraction is also converted to solid coke.

Another process used to treat the bottom of the barrel fraction is to first separate the bottom of the barrel fraction or a portion of the bottom of the barrel fraction. Separation methods can include distillation and solvent deasphalting. Distillation is the most common process. Solvent deasphalting can be used to separate an asphaltene fraction containing asphaltenes and a concentrated amount of heteroatoms. However, separation process do not of themselves upgrade the heavy compounds in the bottom of the barrel fraction and thus, must be employed with another process to upgrade the heavy compounds.

SUMMARY

Disclosed are methods for upgrading petroleum. Specifically, disclosed are integrated methods and systems for upgrading petroleum to produce a bottom-free hydrocarbon stream.

In a first aspect, a process to produce a light hydrocarbon fraction from a heavy residue feed is provided. The process includes the steps of introducing the heavy residue feed to a first supercritical reactor, introducing a supercritical water feed to the first supercritical reactor, operating the first supercritical reactor such that the heavy residue feed and the supercritical water stream undergo conversion reactions to produce a reactor effluent, where the temperature in the first supercritical water is between 380 deg C. and 450 deg, where the pressure in the first supercritical water is greater than the critical pressure of water, where the reactor effluent includes a light hydrocarbon fraction, a bottom of the barrel fraction, and water. The process further includes the steps of introducing the reactor effluent to a top inlet in a top portion of a second supercritical reactor that includes a vertical reactor, introducing a supercritical water stream to a bottom inlet in a bottom portion of the second supercritical reactor, where the supercritical water stream includes supercritical water, where the temperature of the supercritical water stream is between the critical temperature of water and 10 deg C. less than the temperature of the reactor effluent from the first supercritical reactor, and operating the second supercritical reactor such that the bottom of the barrel fraction is operable to settle in the bottom portion of the second supercritical reactor, where the supercritical water in the supercritical water stream is operable to extract the light hydrocarbon fraction from the reactor effluent. The process further includes the steps of withdrawing an upgraded product stream from a top outlet in the top portion of the second supercritical reactor, where the upgraded product stream includes the light hydrocarbon fraction, and withdrawing a heavy product stream from a bottom outlet in the bottom portion of the second supercritical reactor, where the heavy product stream includes the bottom of the barrel fraction.

In certain aspects, the process further includes the steps of increasing a pressure of a residue feed in a hydrocarbon pump to produce a pressurized residue feed, where the pressure of the pressurized residue feed is greater than the critical pressure of water, introducing the pressurized residue feed to a hydrocarbon exchanger, increasing a temperature of the pressurized residue feed in the hydrocarbon exchanger to produce the heavy residue feed, increasing a pressure of a water feed in a water pump to produce a pressurized water feed, where the pressure of the pressurized water feed is greater than the critical pressure of water, introducing the pressurized water feed to a water exchanger, increasing a temperature of the pressurized water feed in the water exchanger to produce the supercritical water feed, increasing a pressure of a water stream in a liquid pump to produce a pressurized water stream, where the pressure of the pressurized water stream is greater than the critical pressure of water, introducing the pressurized water stream to a water heater, and increasing a temperature of the pressurized water stream in the water heater to produce the supercritical water stream. In certain aspects, the process further includes the steps of introducing the heavy residue feed to a mixer, introducing the supercritical water feed to the mixer, mixing the heavy residue feed and the supercritical water feed to produce a mixed feed, where a ratio of the volumetric flow rate of the supercritical water feed to the volumetric flow rate of the heavy residue feed is between 10:1 and 1:4 at standard ambient temperature and pressure (SATP), and introducing the mixed feed to the first supercritical reactor. In certain aspects, the upgraded product stream includes less than 10 wt % bottom of the barrel fraction. In certain aspects, a ratio of the volumetric flow rate of the supercritical water stream to the combined volumetric flow rate of heavy residue feed and supercritical water feed is between 5:1 and 1:10 at standard atmospheric temperature and pressure (SATP). In certain aspects, a residence time in the first supercritical reactor is between 1.2 minutes and 60 minutes. In certain aspects, a ratio of a total flow rate at SATP in second supercritical reactor to a reactor volume of second supercritical reactor is between 1 per hour and 6 per hour. In certain aspects, the heavy residue feed is selected from the group consisting of an atmospheric residue, a vacuum gas oil, and a vacuum residue. In certain aspects, the bottom portion includes the section of a cylindrical body of the supercritical reactor defining 10% of the total length measured from a lowest elevation of the cylindrical body of the second supercritical reactor. In certain aspects, the top portion includes the section of a cylindrical body of the supercritical reactor defining 10% of the total length measured from a highest elevation of the cylindrical body of the second supercritical reactor.

In a second aspect, a system to produce a light hydrocarbon fraction from a heavy residue feed is provided. The system includes a first supercritical reactor configured to operate such that the heavy residue feed and a supercritical water feed undergo conversion reactions to produce a reactor effluent, where the temperature in the first supercritical water is between 380 deg C. and 450 deg, where the pressure in the first supercritical water is greater than the critical pressure of water, where the reactor effluent includes a light hydrocarbon fraction, a bottom of the barrel fraction, and water, a top inlet in a top portion of a second supercritical reactor fluidly connected to the first supercritical reactor, the top inlet configured to receive the reactor effluent, where the second supercritical reactor includes a vertical reactor, a bottom inlet in a bottom portion of the second supercritical reactor, the bottom inlet configured to receive a supercritical water stream, where the supercritical water stream includes supercritical water, where the temperature of the supercritical water stream is between the critical temperature of water and 10 deg C. less than the temperature of reactor effluent, the second supercritical reactor configured to operate such that the bottom of the barrel fraction is configured to settle in the bottom portion of the second supercritical reactor, where the supercritical water in the supercritical water stream is operable to extract the light hydrocarbon fraction from the reactor effluent, a top outlet fluidly connected to the top portion of the second supercritical reactor, the top outlet configured to receive an upgraded product stream, where the upgraded product stream includes the light hydrocarbon fraction, and a bottom outlet in the bottom portion of the second supercritical reactor, the bottom outlet configured to receive a heavy product stream that includes the bottom of the barrel fraction.

In certain aspects, the system further includes a hydrocarbon pump configured to increase a pressure of a residue feed to produce a pressurized residue feed, where the pressure of the pressurized residue feed is greater than the critical pressure of water, a hydrocarbon exchanger fluidly connected to the hydrocarbon pump configured to increase a temperature of the pressurized residue feed in the hydrocarbon exchanger to produce the heavy residue feed, a water pump configured to increase a pressure of a water feed to produce a pressurized water feed, where the pressure of the pressurized water feed is greater than the critical pressure of water, a water exchanger fluidly connected to the water pump configured to increase a temperature of the pressurized water feed in the water exchanger to produce the supercritical water feed, a liquid pump configured to increase a pressure of a water stream to produce a pressurized water stream, where the pressure of the pressurized water stream is greater than the critical pressure of water, and a water heater fluidly connected to the liquid pump, the water heater configured to increase a temperature of the pressurized water stream to produce the supercritical water stream. In certain aspects, the system further includes the steps of a mixer fluidly connected to the hydrocarbon exchanger and the water exchanger, the mixer configured to mix the heavy residue feed and the supercritical water feed to produce a mixed feed, where a ratio of the volumetric flow rate of the supercritical water feed to the volumetric flow rate of the heavy residue feed is between 10:1 and 1:4 at standard ambient temperature and pressure (SATP).

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

Figure 1:
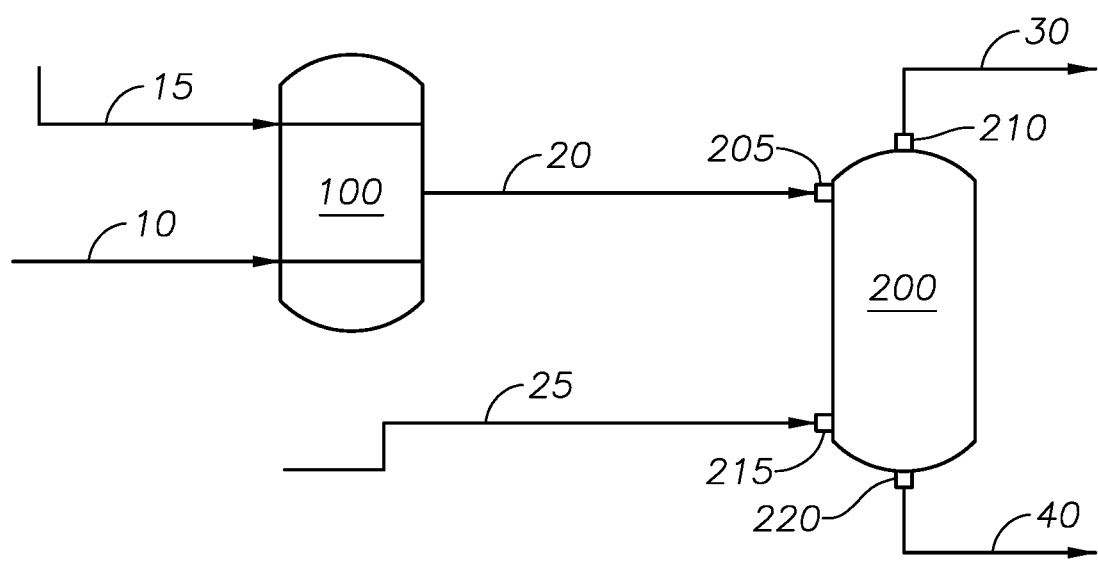
FIG. 1 provides a process diagram of an embodiment of the process.

In the accompanying Figures, similar components or features, or both, may have a similar reference label.

DETAILED DESCRIPTION

While the scope of the apparatus and method will be described with several embodiments, it is understood that one of ordinary skill in the relevant art will appreciate that many examples, variations and alterations to the apparatus and methods described here are within the scope and spirit of the embodiments.

Accordingly, the embodiments described are set forth without any loss of generality, and without imposing limitations, on the embodiments. Those of skill in the art understand that the scope includes all possible combinations and uses of particular features described in the specification.

Described here are processes and systems for upgrading a bottom of the barrel fraction to produce a light hydrocarbon fraction that is bottom-free.

Advantageously, the process for upgrading a bottom of the barrel fraction can produce a bottom-free hydrocarbon stream from a heavy residue feed using supercritical water. Advantageously, the process for upgrading a bottom of the barrel fraction enables upgrading and separation in the one step of the process. Advantageously, the bottom-free hydrocarbon stream can contain a minimal amount of the bottom of the barrel fraction. Advantageously, the bottom-free hydrocarbon stream can be used in other fractions requiring a minimal amount of the bottom of the barrel fraction, such as hydroprocessing, a coking process, a gasification process, and power generation. Advantageously, the use of a second supercritical reactor as an extractor with supercritical water acting as a solvent can contribute to the separation of the light hydrocarbon fraction from the bottom of the barrel fraction. Advantageously, this separation function aids in production of a bottom-free hydrocarbon fraction. Advantageously, the addition of the second supercritical reactor avoids the installation of a separation unit or separation process to remove the bottom of the barrel fraction from the upgraded hydrocarbons. Advantageously, the process for upgrading a bottom of the barrel fraction combines upgrading and extraction in a single supercritical water process.

As used throughout, "external supply of hydrogen" refers to the addition of hydrogen to the feed to the reactor or to the reactor itself. For example, a reactor in the absence of an external supply of hydrogen means that the feed to the reactor and the reactor are in the absence of added hydrogen gas ($H_2$) or liquid, such that no hydrogen (in the form $H_2$) is a feed or a part of a feed to the reactor.

As used throughout, "external supply of catalyst" refers to the addition of catalyst to the feed to the reactor or the presence of a catalyst in the reactor, such as a fixed bed catalyst in the reactor. For example, a reactor in the absence of an external supply of catalyst means no catalyst has been added to the feed to the reactor and the reactor does not contain a catalyst bed in the reactor.

As used throughout, "atmospheric residue" or "atmospheric residue fraction" refers to the fraction of oil-containing streams having a T5% cut point of 600 deg F., such that 95 wt % of the hydrocarbons have boiling points greater than 600 deg F., and alternately a T5% cut point of 650 deg F., such that 95 wt % of the hydrocarbons have boiling points greater than 650 deg F. The atmospheric residue includes the vacuum residue fraction. Atmospheric residue can refer to the composition of an entire stream, such as when the feedstock is from an atmospheric distillation unit, or can refer to a fraction of a stream, such as when a whole range crude is used.

As used throughout, "bottom of the barrel" or "bottom of the barrel fraction" or "vacuum residue" or "vacuum residue fraction" refers to the fraction of oil-containing streams having a T10% cut point of greater than 900 deg F., such that 90 wt % of the hydrocarbons have boiling points greater than 900 deg F., and alternately, a T10% cut point of greater than 1050 deg F., such that 90 wt % of the hydrocarbons have boiling points greater than 1050 deg F. Vacuum residue can refer to the composition of an entire stream, such as when the feedstock is from a vacuum distillation unit or can refer to a fraction of stream, such as when a whole range crude is used.

As used throughout, "T10% cut point" refers to the True Boiling Point (TBP) at which 10% of the volume of oil can be recovered. Cut points refer to the temperature that represents the limits of a distillate fraction.

As used throughout, "T95% cut point" refers to the True Boiling Point (TBP) at which 95% of the volume of oil can be recovered. Cut points refer to the temperature that represents the limits of a distillate fraction.

As used throughout, "asphaltene" refers to the fraction of an oil-containing stream, which is not soluble in a n-alkane, such as n-pentane or more particularly, n-heptane.

As used throughout, "heavy fraction" refers to the fraction in the petroleum feed having a true boiling point (TBP) 10% that is equal to or greater than 650 deg F. (343 deg C.), and alternately equal to or greater than 1050 deg F. (566 deg C.). Examples of a heavy fraction can include the atmospheric residue fraction or vacuum residue fraction. The heavy fraction can include components from the petroleum feed that were not converted in the supercritical water reactor. The heavy fraction can also include hydrocarbons that were dimerized or oligomerized in the supercritical water reactor due to either lack of hydrogenation or resistance to thermal cracking.

As used throughout, "light hydrocarbon fraction" refers to the fraction in the petroleum feed that is not considered the heavy fraction. For example, when the heavy fraction refers to the fraction having a TBP 10% that is equal to or greater than 650 deg F. the light hydrocarbon fraction has a TBP 90% that is less than 650 deg F. For example, when the heavy fraction refers to the fraction having a TBP 10% equal to or greater than 1050 deg F. the light hydrocarbon fraction has a TBP 90% that is less than 1050 deg F.

As used throughout, "coke" refers to the toluene insoluble material present in petroleum.

As used throughout, "bottom-free hydrocarbon stream" refers to a stream that contains less than 10 wt % heavy fraction, alternately less than 8 wt % heavy fraction, alternately less than 5 wt % heavy fraction, and alternately less than 1 wt % heavy fraction.

As used throughout, "cracking" refers to the breaking of hydrocarbons into smaller ones containing fewer carbon atoms due to the breaking of carbon-carbon bonds.

As used throughout, "upgrade" means one or all of increasing API gravity, decreasing the amount of impurities, such as sulfur, nitrogen, and metals, decreasing the amount of asphaltene, and increasing the amount of the light hydrocarbon fraction in a process outlet stream relative to the process feed stream. One of skill in the art understands that upgrade can have a relative meaning such that a stream can be upgraded in comparison to another stream, but can still contain undesirable components such as impurities.

As used here, "conversion reactions" refers to reactions that can upgrade a hydrocarbon stream including cracking, isomerization, alkylation, dimerization, aromatization, cyclization, desulfurization, denitrogenation, deasphalting, and demetallization.

The following embodiments, provided with reference to the figures, describe the upgrading process.

Referring to FIG. 1, a process flow diagram of an upgrading process is provided. Heavy residue feed 10 is introduced to first supercritical reactor 100 along with supercritical water feed 15. Heavy residue feed 10 can be any petroleum feedstock containing a bottom of the barrel fraction. The petroleum feedstock can be any hydrocarbon source derived from petroleum, coal, coal liquid, or biomaterials. Heavy residue feed 10 can include whole range crude oil, distilled crude oil, residue oil, topped crude oil, product stream from oil refineries, product streams from steam cracking processes, liquefied coals, liquid products recovered from oil or tar sands, bitumen, oil shale, asphaltene, and biomass hydrocarbons. Residue oils can include atmospheric residue, vacuum gas oil, and bottom of the barrel fraction. In at least one embodiment, heavy residue feed 10 is selected from atmospheric residue, vacuum gas oil, and vacuum residue. Heavy residue feed 10 can be at a pressure between 22.064

MPa and 30 MPa and can be at a temperature between ambient temperature and 250 deg C. Temperature should be maintained at or less than 250 deg C. to reduce or eliminate the formation of coke in the process units and piping upstream of first supercritical reactor 100.

Supercritical water feed 15 can be any demineralized water having a conductivity less than 1.0 microSiemens per centimeter (μS/cm), alternately less 0.5 μS/cm, and alternately less than 0.1 μS/cm. In at least one embodiment, supercritical water feed 15 is demineralized water having a conductivity less than 0.1 μS/cm. Supercritical water feed 15 can have a sodium content of less than 5 micrograms per liter (μg/L) and alternately less than 1 μg/L. Supercritical water feed 15 can have a chloride content of less than 5 μg/L and alternately less than 1 μg/L. Supercritical water feed 15 can have a silica content of less than 3 μg/L. Supercritical water feed 15 can be at a pressure between 22.064 MPa and 30 MPa. The temperature of supercritical water feed 15 can be greater than the supercritical temperature of water, alternately at a temperature between 374 deg C. and 600 deg C., and alternately between 400 deg C. and 550 deg C. Maintaining the temperature of supercritical water feed 15 at less than 600 deg C. avoids the use of special high temperature alloys in piping and connections within the system.

The ratio of the volumetric flow rate of supercritical water feed 15 to heavy residue feed 10 can be between 10:1 and 1:4 at standard ambient temperature and pressure (SATP), alternately between 3:1 and 1:2 at SATP, and alternately between 2:1 to 1:1 at SATP.

In an embodiment of the upgrading process, heavy residue feed 10 and supercritical water feed 15 can be mixed upstream of first supercritical reactor 100 and introduced to first supercritical reactor 100 as a mixed stream.

Figure 2:
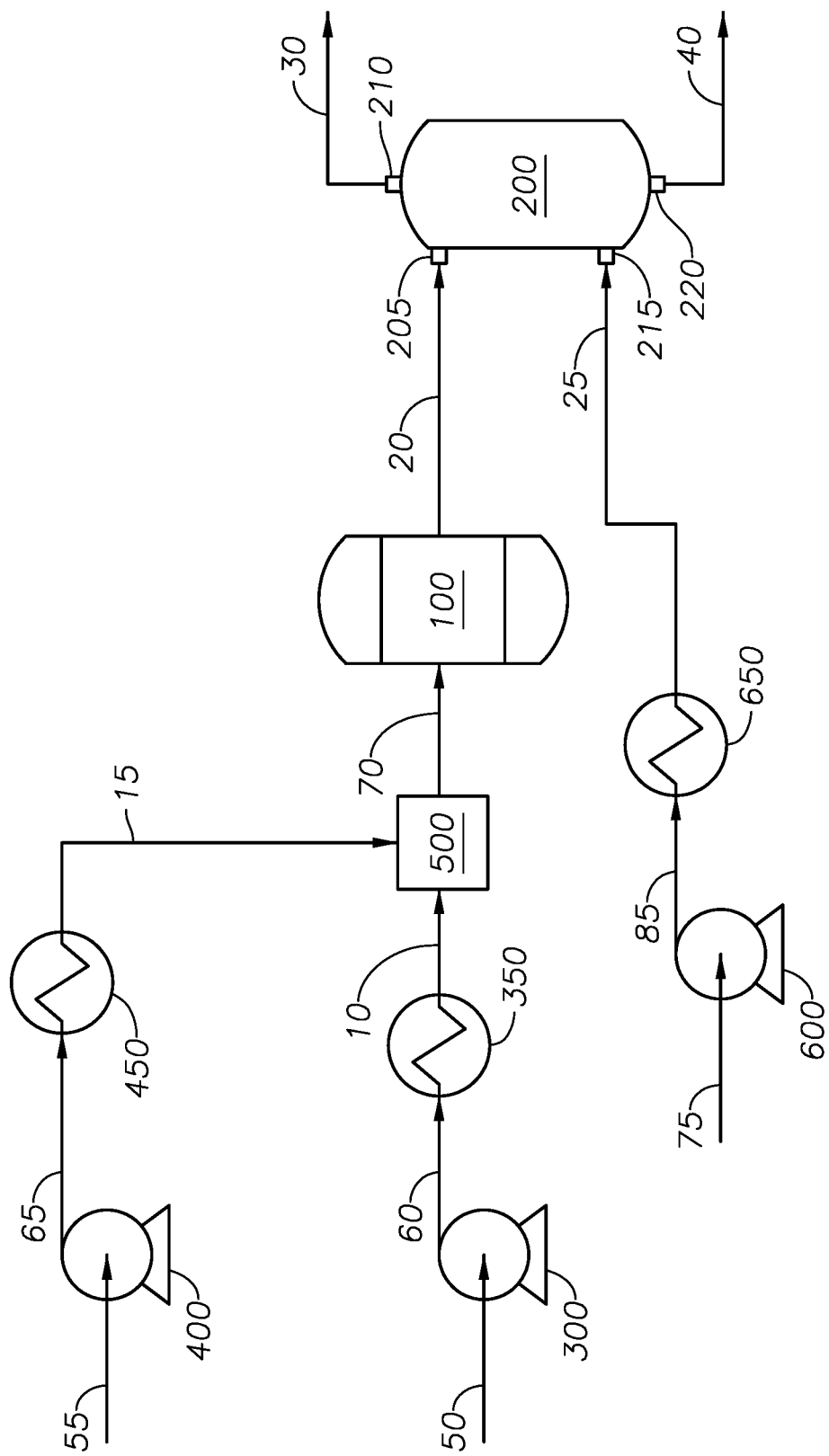
FIG. 2 provides a process diagram of an embodiment of the process.

Referring to FIG. 2, an embodiment of the upgrading process is provided with reference to FIG. 1. Residue feed 50 can be introduced to hydrocarbon pump 300. Residue feed 50 can be any petroleum feedstock containing a bottom of the barrel fraction. The petroleum feedstock can be any hydrocarbon source derived from petroleum, coal, coal liquid, or biomaterials. Residue feed 50 can include whole range crude oil, distilled crude oil, residue oil, topped crude oil, product stream from oil refineries, product streams from steam cracking processes, liquefied coals, liquid products recovered from oil or tar sands, bitumen, oil shale, asphaltene, and biomass hydrocarbons. Residue oils can include atmospheric residue, vacuum gas oil, and vacuum residue. In at least one embodiment, residue feed 50 is selected from atmospheric residue, vacuum gas oil, and vacuum residue. In at least one embodiment, residue feed 50 can be at ambient pressure and can be at a temperature to ensure the petroleum feedstock flows.

Hydrocarbon pump 300 can be any type of pump capable of increasing the pressure of residue feed 50 to greater than the critical pressure of water. Examples of pumps suitable for use as hydrocarbon pump 300 can include metering pumps, plunger pumps, or any other pumps known in the art. The pressure of residue feed 50 can be increased in hydrocarbon pump 300 to produce pressurized residue feed 60. The pressure of pressurized residue feed 60 can be greater than the critical pressure of water and alternately between 22.064 MPa and 30 MPa. Pressurized residue feed 60 can be introduced to hydrocarbon exchanger 350.

Hydrocarbon exchanger 350 can be any type of heat exchanger capable of increasing the temperature of pressurized residue feed 60. Examples of hydrocarbon exchanger 350 can include a heat exchanger, an electric heater, and a fired heater. The temperature of pressurized residue feed 60 can be increased in hydrocarbon exchanger 350 to produce heavy residue feed 10. The temperature of heavy residue feed 10 can depend on the viscosity of residue feed 50. For viscous feeds, the temperature should be sufficient to enable residue feed 50 to flow.

Water feed 55 can be introduced to water pump 400. Water feed 55 can be any demineralized water having a conductivity less than 1.0 microSiemens per centimeter (μS/cm), alternately less 0.5 μS/cm, and alternately less than 0.1 μS/cm. In at least one embodiment, water feed 55 is demineralized water having a conductivity less than 0.1 μS/cm. Water feed 55 can have a sodium content of less than 5 micrograms per liter (μg/L) and alternately less than 1 μg/L. Water feed 55 can have a chloride content of less than 5 μg/L and alternately less than 1 μg/L. Water feed 55 can have a silica content of less than 3 μg/L. In at least one embodiment, water feed 55 can be at ambient temperature and a pressure between 5 psig and 100 psig such that dissolved gases can be removed.

Water pump 400 can be any type of pump capable of increasing the pressure of water feed 55 to greater than the critical pressure of water. Examples of pumps suitable for use as water pump 400 can include metering pumps, plunger pumps, or any other pumps known in the art. The pressure of water feed 55 can be increased in water pump 400 to produce pressurized water feed 65. The pressure of pressurized water feed 65 can be greater than the critical pressure of water and alternately between 22.064 Megapascals (MPa) and 30 MPa. Pressurized water feed 65 can be introduced to water exchanger 450.

Water exchanger 450 can be any type of heat exchanger capable of increasing the temperature of pressurized water feed 65 to greater than the critical temperature of water. Examples of water exchanger 450 can include a heat exchanger, an electric heater, and a fired heater. The temperature of pressurized water feed 65 can be increased in water exchanger 450 to produce supercritical water feed 15.

Heavy residue feed 10 and supercritical water feed 15 can be introduced to mixer 500 to produce mixed feed 70. Mixer 500 can be any type of mixing device capable of mixing a petroleum feedstock and a supercritical water stream. Examples of mixing devices suitable for use as mixer 500 can include a static mixer, an inline mixer, an impeller-embedded mixer, a CSTR-type mixer, and other mixers. The ratio of the volumetric flow rate of supercritical water feed 15 to heavy residue feed 10 introduced to mixer 500 can be between 10:1 and 1:4 at standard ambient temperature and pressure (SATP), alternately between 3:1 and 1:2 at SATP, and alternately between 2:1 to 1:1 at SATP. The pressure of mixed feed 70 can be between 22.064 MPa and 30 MPa. The temperature of mixed feed 70 can depend on the temperature of heavy residue feed 10 and supercritical water feed 15. The temperature of mixed feed 70 can be greater than 360 deg C., alternately between 360 deg C. and 500 deg C., alternately between 380 deg C. and 450 deg C. The temperature in mixed feed 70 can be tuned by adjusting the temperature of heavy residue feed 10, supercritical water feed 15, and adjusting both heavy residue feed 10 and supercritical water feed 15. In at least one embodiment, a temperature sensor can be placed at the outlet of mixer 500. The temperature sensor can provide data on the temperature of mixed feed 70 as part of a control loop to tune the temperature in mixed feed 70.

Returning to FIG. 1, first supercritical reactor 100 can be any type of reactor capable of operating under supercritical conditions and allowing conversion reactions. In at least one embodiment, first supercritical reactor 100 can include more than one physical unit. Examples of reactors suitable for use in first supercritical reactor 100 can include tubular-type, vessel-type, CSTR-type, and combinations of the same. First supercritical reactor 100 can include an upflow reactor, a downflow reactor, and a combination of at least one upflow reactor and at least one downflow reactor. First supercritical reactor 100 can include a vertical reactor, a horizontal reactor, or mixed vertical reactor and horizontal reactor. First supercritical reactor 100 can have a reactor volume such that the ratio of total flow rate at SATP to reactor volume is between 0.5 per hour and 4.5 per hour and alternately between 1.2 per hour and 3.2 per hour. The total flow rate is the sum of the flow rate of heavy residue feed 10 and supercritical water feed 15. The residence time in first supercritical reactor 100 can be in the range between 1.2 minutes (min) and 60 min and alternately between 2 min and 27 min. The residence time in first supercritical reactor 100 is calculated by assuming the internal fluid has the same density as water at the conditions in first supercritical reactor 100. The temperature in first supercritical reactor 100 can be maintained at a temperature between 380 deg C. and 450 deg C. and alternately between 405 deg C. and 450 deg C. The temperature in first supercritical reactor 100 is not isothermal. First supercritical reactor 100 can include a heater to maintain the temperature. The heater can be an internal heater, an external heater, and combinations of the same. Examples of suitable heaters can include an electric heater, a fired heater, a heat exchanger and combinations of the same. The pressure in first supercritical reactor 100 can be maintained at a pressure between 22.074 MPa and 30 MPa. First supercritical reactor 100 is in the absence of an external supply of catalyst. In at least one embodiment, first supercritical reactor 100 can be in the absence of an external supply of hydrogen. Heavy residue feed 10 and supercritical water feed 15 undergo conversion reactions in first supercritical reactor 100 to produce reactor effluent 20.

Thermal cracking of hydrocarbons in supercritical water is different from conventional thermal processes such as coking and hydroprocessing. Hydrocarbon reactions in supercritical water upgrade heavy oil and crude oil containing sulfur compounds to produce products that have lighter fractions. Supercritical water has unique properties making it suitable for use as a petroleum reaction medium where the reaction objectives can include conversion reactions, desulfurization reactions denitrogenation reactions, and demetallization reactions. Supercritical water is water at a temperature at or greater than the critical temperature of water and at a pressure at or greater than the critical pressure of water. The critical temperature of water is 373.946° C. The critical pressure of water is 22.06 megapascals (MPa). Advantageously, the dielectric constant of supercritical water enables hydrocarbons to be dissolved in it. Advantageously, at supercritical conditions water acts as both a hydrogen source and a solvent (diluent) in conversion reactions, desulfurization reactions and demetallization reactions and a catalyst is not needed. Hydrogen from the water molecules is transferred to the hydrocarbons through direct transfer or through indirect transfer, such as the water gas shift reaction.

Without being bound to a particular theory, it is understood that the basic reaction mechanism of supercritical water mediated petroleum processes is the same as a free radical reaction mechanism. Radical reactions include initiation, propagation, and termination steps. With hydrocarbons, especially heavy molecules such as C10+, initiation is the most difficult step. Initiation requires the breaking of chemical bonds. The bond energy of carbon-carbon bonds is about 350 kJ/mol, while the bond energy of carbon-hydrogen is about 420 kJ/mol. Due to the chemical bond energies, carbon-carbon bonds and carbon-hydrogen bonds do not break easily at the temperatures in a supercritical water process, 380 deg C. to 450 deg C., without catalyst or radical initiators. In contrast, carbon-sulfur bonds cover a range of bond energies that are each lower than the bond energies of carbon-carbon bonds and carbon-hydrogen bonds.

Thermal energy creates radicals through chemical bond breakage. Supercritical water creates a "cage effect" by surrounding the radicals. The radicals surrounded by water molecules cannot react easily with each other, and thus, intermolecular reactions that contribute to coke formation are suppressed. The cage effect suppresses coke formation by limiting inter-radical reactions. Supercritical water, having low dielectric constant, dissolves hydrocarbons and surrounds radicals to prevent the inter-radical reaction, which is the termination reaction resulting in condensation (dimerization or polymerization). Because of the barrier set by the supercritical water cage, hydrocarbon radical transfer is more difficult in supercritical water as compared to compared to conventional thermal cracking processes, such as delayed coker, where radicals travel freely without such barriers.

In at least one embodiment, the temperature of reactor effluent 20 can be monitored with a temperature sensor at the outlet of first supercritical reactor 100. The temperature of reactor effluent 20 can be monitored as part of the process control scheme of the system. Monitoring the temperature of reactor effluent 20 can be used to control the power used by the heaters for first supercritical reactor 100.

Reactor effluent 20 can contain a light hydrocarbon fraction, a bottom of the barrel fraction, and water. Reactor effluent 20 can contain upgraded hydrocarbons as compared to heavy residue feed 10. Reactor effluent 20 can be a well-mixed stream, such that the hydrocarbons are dispersed in the supercritical water creating a more homogeneous stream than when the supercritical water and hydrocarbons are first in contact. Reactor effluent 20 can contain part of the light hydrocarbon fraction mixed in supercritical water and can include part of the light hydrocarbon fraction mixed in the bottom of the barrel fraction.

Reactor effluent 20 is introduced to top inlet 205 of second supercritical reactor 200. Supercritical water stream 25 is introduced to bottom inlet 215 of second supercritical reactor 200.

Supercritical water stream 25 can be any demineralized water having a conductivity less than 1.0 microSiemens per centimeter (µS/cm), alternately less 0.5 µS/cm, and alternately less than 0.1 µS/cm. In at least one embodiment, supercritical water stream 25 is demineralized water having a conductivity less than 0.1 µS/cm. Supercritical water stream 25 can have a sodium content of less than 5 micrograms per liter (µg/L) and alternately less than 1 µg/L. Supercritical water stream 25 can have a chloride content of less than 5 µg/L and alternately less than 1 µg/L. Supercritical water stream 25 can have a silica content of less than 3 µg/L. Supercritical water stream 25 can be at a temperature greater than the critical temperature of water, alternately at a temperature between the critical temperature of water and 10 degrees less than the temperature of reactor effluent 20, and alternately at a temperature between 10 degrees and 50 degrees less than the temperature of reactor effluent 20. For example, if the temperature of reactor effluent 20 is at 450 deg C., then the temperature of supercritical water stream 25 is between 400 deg C. and 440 deg C. and alternately if the temperature of reactor effluent 20 is at 380 deg C., then the temperature of supercritical water stream 25 is between the critical temperature of water and 380 deg C. Maintaining the temperature of supercritical water stream 25 below the temperature of reactor effluent 20 can reduce conversion reactions from occurring in supercritical reactor 200.

Referring to FIG. 2, an embodiment of the upgrading process is provided with reference to FIG. 1. Water stream 75 can be introduced to liquid pump 600. Water stream 75 can be any demineralized water having a conductivity less than 1.0 microSiemens per centimeter (µS/cm), alternately less 0.5 µS/cm, and alternately less than 0.1 µS/cm. In at least one embodiment, water stream 75 is demineralized water having a conductivity less than 0.1 µS/cm. Water stream 75 can have a sodium content of less than 5 micrograms per liter (µg/L) and alternately less than 1 µg/L. Water stream 75 can have a chloride content of less than 5 µg/L and alternately less than 1 µg/L. Water stream 75 can have a silica content of less than 3 µg/L. In at least one embodiment, water stream 75 can be at ambient temperature and pressure between 5 psig and 100 psig. In at least one embodiment, repeating the steps of pressurizing and depressurizing between 5 psig and 100 psig can remove the dissolved gases.

Liquid pump 600 can be any type of pump capable of increasing the pressure of water stream 75 to greater than the critical pressure of water. Examples of pumps suitable for use as liquid pump 600 can include metering pumps, plunger pumps, or any other pumps known in the art. The pressure of water stream 75 can be increased in liquid pump 600 to produce pressurized water stream 85. The pressure of pressurized water stream 85 can be greater than the critical pressure of water and alternately between 22.064 Megapascals (MPa) and 30 MPa. Pressurized water stream 85 can be introduced to water heater 650.

Water heater 650 can be any type of heat exchanger capable of increasing the temperature of pressurized water stream 85 to greater than the critical temperature of water. Examples of water heater 650 can include a heat exchanger, an electric heater, and a fired heater. The temperature of pressurized water stream 85 can be increased in water heater 650 to produce supercritical water stream 25.

Returning to FIG. 1, the ratio of the volumetric flow rate of supercritical water stream 25 to the combined volumetric flow rate of heavy residue feed 10 and supercritical water feed 15 can be between 5:1 and 1:10 at SATP and alternately between 1:1 and 1:4 at SATP. Maintaining a ratio of heavy residue feed 10 to supercritical water feed 15 of less than 5:1 increases the efficiency of extraction in second supercritical reactor 200, as a ratio greater than 5:1 reduces the separation efficiency and makes oil and water separation more difficult. Conversely, at a ratio of heavy residue feed 10 to supercritical water feed 15 of less than 1:10 can also reduce separation efficiency and make oil and water separation more difficult.

Second supercritical reactor 200 can be any type of vertical vessel. Examples of reactors suitable for use in second supercritical reactor 200 can include tubular-type, vessel-type, and combinations of the same. In at least one embodiment, second supercritical reactor 200 can be a vessel-type reactor. Second supercritical reactor 200 can have a body and two heads, also referred to as ends. The body of second supercritical reactor 200 can be a cylindrical body. The heads of supercritical reactor 200 can be hemispherical-type, ellipisoidal-type, conical-type, or combinations of the same. In at least one embodiment, each head of second supercritical reactor 200 is the same type. In at least one embodiment, each head of second supercritical reactor 200 is a different type.

Second supercritical reactor 200 can have a reactor volume such that the ratio of total flow rate at SATP to reactor volume is between 1 per hour and 6 per hour and alternately between 1.25 per hour and 3.5 hour. The total flow rate at SATP is the sum of the flow rate of heavy residue feed 10, supercritical water feed 15, and supercritical water stream 25. The reactor volume of second supercritical reactor 200 is greater than the reactor volume of first supercritical reactor 100. The greater volume in second supercritical reactor 200 facilitates separation of the light components and the heavy components. Second supercritical reactor 200 is in the absence of an external supply of catalyst. Second supercritical reactor 200 can be in the absence of an external supply of hydrogen. Second supercritical reactor 200 is in the absence of added carbon, such as activated carbon. The pressure in second supercritical reactor 200 is maintained between 22.064 MPa and 30 MPa. Second supercritical reactor 200 can act as an extractor for separating the light components and heavy components in reactor effluent 20 with minimal conversion reactions occurring. A greater amount of conversion occurs in first supercritical reactor 100 than second supercritical reactor 200.

Second supercritical reactor 200 includes four ports, top inlet 205, bottom inlet 215, top outlet 210, and bottom outlet 220. The ports can be any type of port capable of providing fluid flow to and from second supercritical reactor 200. Each port can be sized based on the flow conditions of the fluid stream that passes through that port.

In at least one embodiment, top inlet 205 and top outlet 210 can be positioned in the top portion of second supercritical reactor 200, such that top inlet 205 is at a lower elevation relative to the position of top outlet 210. The top portion is defined as the section of the cylindrical body of supercritical reactor 200 defining 10% of the total length measured from the highest elevation of the cylindrical body of second supercritical reactor 200. The highest elevation is the point on the cylindrical body of reactor 200 that is the longest vertical distance from grade. For example, if the total length of the cylindrical body of second supercritical reactor 200 is 10 meters (m), the top portion is 1 m measured from the highest elevation of the cylindrical body of second supercritical reactor 200. The top portion does not include the top head. Top inlet 205 can be positioned in the top portion of second supercritical reactor 200 below the top head. In at least one embodiment, top inlet 205 can be positioned in the top portion of second supercritical reactor 200 and top outlet 210 can be positioned in the top head of second supercritical reactor 200. In at least one embodiment, top outlet 210 can be positioned at the highest elevation of the top head. The placement of top outlet 210 in the top head avoids the inlet stream of reactor effluent 20 from entering through top inlet 205 and immediately exiting through top outlet 210. Placement of top outlet 210 in the top head ensures reactor effluent 20 can interact with supercritical water stream 25. Top outlet 210 is placed at a higher elevation than top inlet 205.

In at least one embodiment, bottom inlet 215 and bottom outlet 220 can be positioned in the bottom portion of second supercritical reactor 200, such that bottom outlet 220 is at a lower elevation than bottom inlet 215. The bottom portion is defined as the section of cylindrical body of supercritical reactor 200 defining 10% of the total length measured from the lowest elevation of the cylindrical body of second supercritical reactor 200. The lowest elevation is the point on supercritical reactor 200 that is the shortest vertical distance from grade. For example, if the total length of second supercritical reactor 200 is 10 m, the bottom portion is 1 m measured from the lowest elevation of the cylindrical body of second supercritical reactor 200. The bottom portion does not include the bottom head. Bottom inlet 215 can be positioned in the bottom portion of second supercritical reactor 200 above the bottom head. In at least one embodiment, bottom inlet 215 can be positioned in the bottom portion of second supercritical reactor 200 and bottom outlet 220 can be positioned in the bottom head of second supercritical reactor 200. In at least one embodiment, bottom outlet 220 can be positioned at the lowest elevation of the bottom head. The placement of bottom inlet 215 at a higher elevation than bottom outlet 220 can avoid the bottom head acting like a funnel and allows supercritical water stream 25 to interact with the fluids in supercritical reactor 200 without immediately exiting through bottom outlet 220. Bottom outlet 220 is placed at a lower elevation than bottom inlet 215.

One of skill in the art will understand that placement of the nozzles on second supercritical reactor 200 can be determined based on size and spatial constraints.

Second supercritical reactor 200 has a temperature gradient with the greatest temperatures at the top head proximate to top inlet 205 and the lowest temperatures at the bottom head proximate to bottom outlet 220. The maximum temperature in the top portion is the temperature of reactor effluent 20. Second supercritical reactor 200 is not isothermal. Second supercritical reactor 200 can include a heater to maintain the temperature. The heater can be an internal heater, an external heater, and combinations of the same. Examples of suitable heaters can include an electric heater, a fired heater, a heat exchanger and combinations of the same. Additionally, insulation and heat tracing elements can be used to maintain the temperature gradient desired within second supercritical reactor 200. The temperature in the bottom portion of second supercritical reactor 200 being less than the temperature of reactor effluent 20 can reduce or eliminate the occurrence of conversion reactions occurring in the bottom portion with the heavy product. Advantageously, reducing or eliminating the occurrence of conversion reactions in second supercritical reactor 200 can minimize or prevent the production of coke and reduce potential for coking within second supercritical reactor 200. As a result, the conversion reactions primarily occur in first supercritical reactor 100. In at least one embodiment, less than 5 wt % of the bottom of the barrel fraction undergoes conversion reactions in second supercritical reactor 200, and alternately less than 3 wt %.

In second supercritical reactor 200 the supercritical water from supercritical water stream 25 can push the light hydrocarbon fraction in the bottom of the barrel fraction toward the top portion while the hydrocarbons in the bottom of the barrel fraction can settle toward the bottom portion. The hydrocarbons in the bottom of the barrel fraction are not easily miscible in supercritical water. However, the organic compounds and light hydrocarbons in the light hydrocarbon fraction can dissolve in the supercritical water from supercritical water stream 25, such that the supercritical water from supercritical water stream 25 can act as an extraction solvent for the light hydrocarbon fraction in the bottom of the barrel fraction. In at least one embodiment, second supercritical reactor 200 is a counter-current extraction type reactor. A counter-current extraction type reactor can maximize the extraction capability of supercritical water. Second supercritical reactor 200 contributes to the separation of the light hydrocarbon fraction from the bottom of the barrel fraction. Advantageously, supercritical water is a suitable solvent for use in extracting light hydrocarbons. Advantageously, energy efficiency is achieved by using and maintaining the energy of reactor effluent stream 20 in second supercritical reactor 200.

Upgraded product stream 30 can be withdrawn from top outlet 210 of second supercritical reactor 200. The temperature of upgraded product stream 30 can be between 380 deg C. and 420 deg C. The pressure of upgraded product stream 30 can be between 22.074 MPa and 30 MPa. Upgraded product stream 30 can include a light hydrocarbon fraction, water and combinations of the same. Upgraded product stream 30 can contain greater than 50 wt % and alternately greater than 75 wt % of the combined amount of water in supercritical water feed 15 and supercritical water stream 25. Upgraded product stream 30 can contain less than 10 wt % bottom of the barrel fraction, alternately less than 5 wt % bottom of the barrel fraction, and alternately less than 1 wt % bottom of the barrel fraction. In at least one embodiment, upgraded product stream 30 contains a reduced amount of metals compared to heavy residue stream 10. In at least one embodiment, upgraded product stream 30 can contain less than 0.5 wt ppm vanadium. In at least one embodiment upgraded product stream 30 can contain less than 0.5 wt ppm nickel. Upgraded product stream 30 can be a bottom-free hydrocarbon stream.

Upgraded product stream 30 can be further processed to reduce the temperature, reduce the pressure, and separate water from the light hydrocarbon fraction. The water-free upgraded product can contain less than 0.3 wt % water.

Upgraded product stream 30 can be further processed and used for power generation. Further processing can include a hydroprocessing system, such as a hydrocracking process. Advantageously, using upgraded product stream 30 in a hydroprocessing system can extend catalyst life in the hydroprocessing system due to reduced amount of catalyst poisoning due to reduced amounts of metals, such as vanadium, and formation of coke. Additionally, a hydroprocessing system using upgraded product stream 30 as the feed can be operated at reduced temperatures, greater space velocity, and reduced hydrogen pressure compared to introducing a heavy residue directly to a hydroprocessing system. Upgraded product stream 30 can be used as a feed stream for power generation in a gas turbine because of the trace amounts of vanadium. Advantageously, using upgraded product stream 30 in a gasification process to produce hydrogen reduces plugging in the gasification process as compared to the bottom fraction from a conventional supercritical water process. In at least one embodiment, upgraded product stream 30 is used in a gasification process.

Heavy product stream 40 can be withdrawn from bottom outlet 220 of second supercritical reactor 200. The temperature of heavy product stream 40 can be between 380 deg C and 420 deg C. The pressure of heavy product stream 40 can be between 22 MPa and 30 MPa. In at least one embodiment, a temperature sensor can be placed proximate to bottom outlet 220. The temperature sensor can provide data on the temperature of heavy product stream 40 as part of a control loop to tune the temperature in second supercritical reactor 200. Heavy product stream 40 can include bottom of the barrel fraction, solid particles, coke precursors, water, and combinations of the same. In at least one embodiment, heavy product stream 40 can contain more aromatic hydrocarbons than non-aromatic hydrocarbons. Heavy product stream 40 can contain the water not present in upgraded product stream 30, including less than 50 wt % and alternately less than 25 wt % of the combined amount of water in supercritical water feed 15 and supercritical water stream 25.

Heavy product stream 40 can be further processed to reduce the temperature, reduce the pressure, and separate water from the bottom of the barrel fraction. The separated heavy hydrocarbons can be used to produce asphalt or solid coke.

The pressure in the system can be maintained from the pumps through the reactors by a depressurizing device downstream of second supercritical reactor 200. In at least one embodiment, upgraded product stream 30 can include a depressurizing device to control pressure in the system. In at least one embodiment, a pressure control device can be positioned between first supercritical reactor 100 and second supercritical reactor 200. In at least one embodiment, heavy product stream 40 can include one or more valves to control flow rate and reduce the pressure of heavy product stream 40.

Both the first supercritical reactor and second supercritical reactor of the process to upgrade the bottom of the barrel fraction are in the absence of a flash drum. The process to upgrade the bottom of the barrel fraction is in the absence of a mixer between the first supercritical reactor and the second supercritical reactor.

EXAMPLES

Examples. The Example was a simulated process using Aspen-HYSYS based on experimental data of a system described with reference to FIG. 2.

Residue feed 50 was introduced to hydrocarbon pump 300 at a flow rate of 650 kg/h and a liquid volume flowrate of 100 barrels per day (barrel/day). The pressure of residue feed 50 was increased in water pump 300 to produce pressurized residue feed 60. Pressurized residue feed 60 was at a pressure of 25 MPa. The temperature of pressurized residue feed 60 was increased in hydrocarbon exchanger 350 to produce heavy residue feed 10. Heavy residue feed 10 was at a temperature of 200 deg C. Heavy residue feed 10 was introduced to mixer 500.

Water feed 55 was introduced to water pump 400 at a flow rate of 661 kg/h and a liquid volume flowrate of 100 barrel/day. The pressure of water feed 55 was increased in water pump 400 to produce pressurized water feed 65. Pressurized water feed 65 was at a pressure of 25 MPa. The temperature of pressurized water feed 65 was increased in water exchanger 450 to produce supercritical water feed 15.

Supercritical water feed 15 was at a temperature of 450 deg C. Supercritical water feed 15 was introduced to mixer 50.

Water stream 75 was introduced to fluid pump 600 at a flow rate of 331 kg/hr and a liquid volume flowrate of 50 barrel/day. The pressure of water stream 75 was increased in fluid pump 600 to produce pressurized water stream 85. Pressurized water stream 85 was at a pressure of 25 MPa. The temperature of pressurized water stream 85 was increased in water heater 650 to produce supercritical water stream 25. Supercritical water stream 25 was at a temperature of 400 deg C.

Heavy residue feed 10 and supercritical water feed 15 were mixed in mixer 50 to produce mixed feed 70. Mixed feed 70 was introduced to first supercritical reactor 100. Reactor effluent 20 was withdrawn from first supercritical reactor 100. Reactor effluent 20 was introduced to top inlet 205 of second supercritical reactor 200. Supercritical water stream 25 was introduced to bottom inlet 210 of second supercritical reactor 200. Upgraded product stream 30 was withdrawn from top outlet 215. Heavy product stream 40 was withdrawn from bottom outlet 220. The stream conditions are shown in Table 1.

TABLE 1

| Stream Conditions | | | |
|---|---|---|---|
| Stream Name | 20 | 30 | 40 |
| Temperature (deg C.) | 420 | 410 | 410 |
| Pressure (MPa) | 25 | 25 | 25 |
| Mass Flow (kg/h) | 1311 | 1291 | 20 |

In the experimental runs, reactor effluent 20, upgraded product stream 30, and heavy product stream 40 were sampled and then subjected to separation methods to separate oil, water, and gases from the streams. The separation methods were performed according to ASTM 4007. The mass flow of liquid hydrocarbons was calculated for each stream and the results are contained in Table 2.

TABLE 2

| Stream Compositions | | | | | |
|---|---|---|---|---|---|
| | | Name | | | |
| | | Residue Feed 50 | Reactor Effluent 20 | Upgraded Product 30 | Heavy Product Stream 40 |
| Specific Gravity (API) | | 12.7 | 17.5 | 21.1 | 10.5 |
| Distillation | 5% | 361 | 297 | 289 | 524 |
| (TBP, deg C.) | 10% | 390 | 337 | 332 | 552 |
| | 30% | 468 | 420 | 406 | 607 |
| | 50% | 524 | 464 | 441 | 621 |
| | 70% | 579 | 519 | 496 | 634 |
| | 90% | 656 | 592 | 552 | 681 |
| Sulfur Content (wt %) | | 3.7 | 2.5 | 1.8 | 4.5 |
| Conradson Carbon Content (wt %) | | 11.3 | 2.9 | 0.3 | 8.2 |
| Kinematic Viscosity @ 121 F. (cSt) | | 760 | 32 | 4 | * |
| Vanadium Content (wt ppm) | | 41 | 7 | <0.1 | 24.3 |
| Mass Flow (kg/hr) | | 650 | 637 | 550 | 78 |

*The kinematic viscosity of heavy product 40 was not measurable because it was greater than the measurable range.

An upgrading process with only one supercritical reactor results in a product stream having about 35 wt % bottom of the barrel. By contrast, the process described here, which includes two supercritical reactors, where the second reactor operates in a cross-flow design results in an upgraded product stream that contains less than 5 wt % bottom of the barrel. An upgraded product stream with less than 5 wt % bottom of the barrel is suitable for use in gasification systems, power generation systems, and conventional hydroprocessing.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

There various elements described can be used in combination with all other elements described here unless otherwise indicated.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed here as from about one particular value to about another particular value and are inclusive unless otherwise indicated. When such a range is expressed, it is to be understood that another embodiment is from the one particular value to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these references contradict the statements made here.

As used here and in the appended claims, the words "comprise," "has," and "include" and all grammatical variations thereof are each intended to have an open, non-limiting meaning that does not exclude additional elements or steps.

That which is claimed is:

1. A system to produce a light hydrocarbon fraction from a heavy residue feed, the system comprising:
    a first supercritical reactor, the first supercritical reactor configured to operate such that the heavy residue feed and a supercritical water feed undergo conversion reactions to produce a reactor effluent, wherein the temperature in the first supercritical reactor is between 380 deg C. and 450 deg C., wherein the pressure in the first supercritical reactor is greater than the critical pressure of water, wherein the reactor effluent comprises a light hydrocarbon fraction, a bottom of the barrel fraction, and water;
    a top inlet in a top portion of a second supercritical reactor fluidly connected to the first supercritical reactor, the top inlet configured to receive the reactor effluent, wherein the second supercritical reactor comprises a vertical reactor;
    a bottom inlet in a bottom portion of the second supercritical reactor, the bottom inlet configured to receive a supercritical water stream, wherein the supercritical water stream comprises supercritical water, wherein the temperature of the supercritical water stream is between the critical temperature of water and 10 deg C. less than the temperature of reactor effluent;
    the second supercritical reactor configured to operate such that the bottom of the barrel fraction is configured to settle in the bottom portion of the second supercritical reactor, wherein the supercritical water in the supercritical water stream is operable to extract the light hydrocarbon fraction from the reactor effluent;
    a top outlet fluidly connected to the top portion of the second supercritical reactor, the top outlet configured to receive an upgraded product stream, wherein the upgraded product stream comprises the light hydrocarbon fraction, wherein the top outlet is positioned at a higher elevation than the top inlet; and
    a bottom outlet in the bottom portion of the second supercritical reactor, the bottom outlet configured to receive a heavy product stream, wherein the heavy product stream comprises the bottom of the barrel fraction, wherein the bottom outlet is positioned at a lower elevation than the bottom inlet.

2. The system of claim 1, further comprising:
    a hydrocarbon pump, the hydrocarbon pump configured to increase a pressure of a residue feed to produce a pressurized residue feed, wherein the pressure of the pressurized residue feed is greater than the critical pressure of water;
    a hydrocarbon exchanger fluidly connected to the hydrocarbon pump, the hydrocarbon exchanger configured to increase a temperature of the pressurized residue feed in the hydrocarbon exchanger to produce the heavy residue feed;
    a water pump, the water pump configured to increase a pressure of a water feed to produce a pressurized water feed, wherein the pressure of the pressurized water feed is greater than the critical pressure of water;
    a water exchanger fluidly connected to the water pump, the water exchanger configured to increase a temperature of the pressurized water feed in the water exchanger to produce the supercritical water feed;
    a liquid pump, the liquid pump configured to increase a pressure of a water stream to produce a pressurized water stream, wherein the pressure of the pressurized water stream is greater than the critical pressure of water; and
    a water heater fluidly connected to the liquid pump, the water heater configured to increase a temperature of the pressurized water stream to produce the supercritical water stream.

3. The system of claim 2, further comprising the steps of:
    a mixer fluidly connected to the hydrocarbon exchanger and the water exchanger, the mixer configured to mix the heavy residue feed and the supercritical water feed to produce a mixed feed, wherein a ratio of the volumetric flow rate of the supercritical water feed to the volumetric flow rate of the heavy residue feed is between 10:1 and 1:4 at standard ambient temperature and pressure (SATP).

4. The system of claim 1, wherein the upgraded product stream comprises less than 10 wt % bottom of the barrel fraction.

5. The system of claim 1, wherein a ratio of the volumetric flow rate of the supercritical water stream to the combined volumetric flow rate of heavy residue feed and supercritical water feed is between 5:1 and 1:10 at standard atmospheric temperature and pressure (SATP).

6. The system of claim 1, wherein a residence time in the first supercritical reactor is between 1.2 minutes and 60 minutes.

7. The system of claim 1, wherein a ratio of a total flow rate at SATP in second supercritical reactor to a reactor volume of second supercritical reactor is between 1 per hour and 6 per hour.

8. The system of claim 1, wherein the heavy residue feed is selected from the group consisting of an atmospheric residue, a vacuum gas oil, and a vacuum residue.

9. The system of claim 1, wherein the bottom portion comprises the section of a cylindrical body of the supercritical reactor defining 10% of the total length measured from a lowest elevation of the cylindrical body of the second supercritical reactor.

10. The system of claim 1, wherein the top portion comprises the section of a cylindrical body of the supercritical reactor defining 10% of the total length measured from a highest elevation of the cylindrical body of the second supercritical reactor.

* * * * *